V. L. DOWNING.
WHEEL.
APPLICATION FILED JULY 30, 1919.
1,339,439. Patented May 11, 1920.
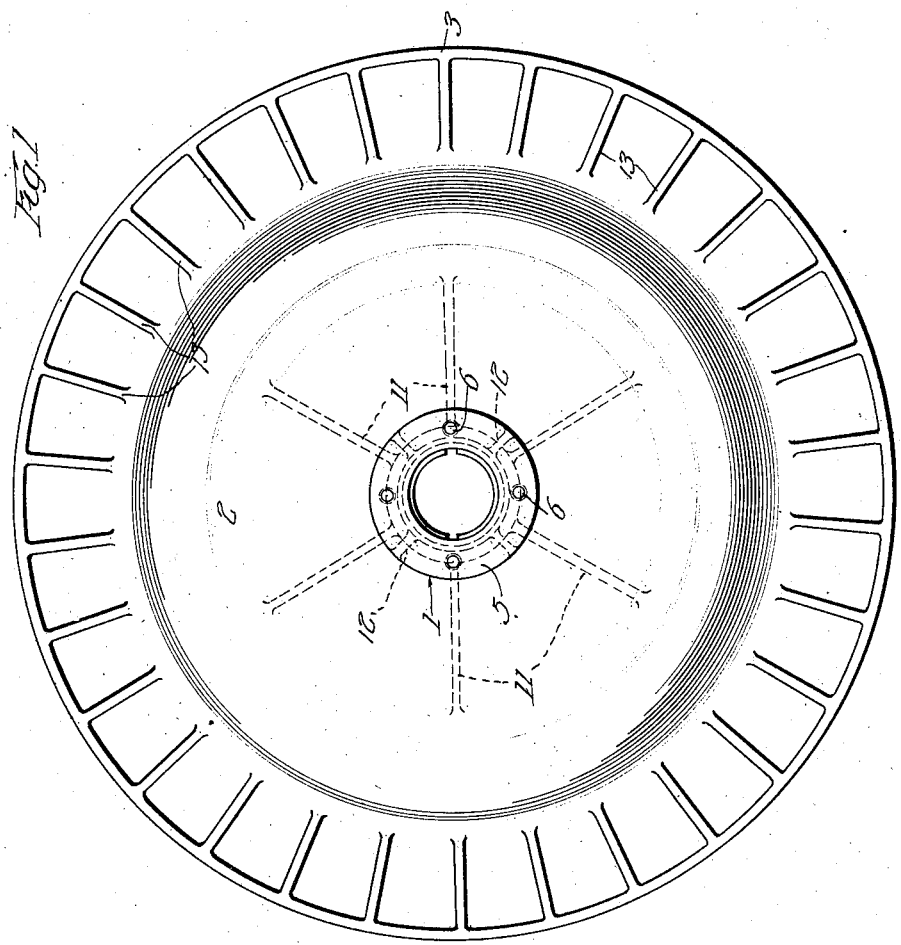
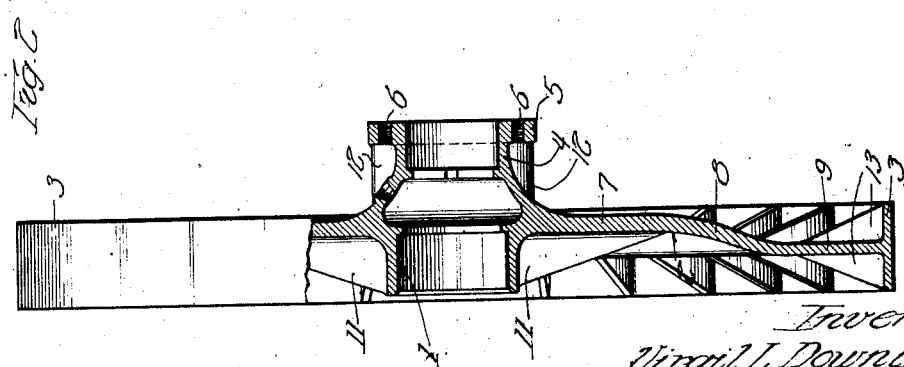
Inventor
Virgil L. Downing

UNITED STATES PATENT OFFICE.

VIRGIL L. DOWNING, OF KENOSHA, WISCONSIN, ASSIGNOR TO WINTHER MOTOR TRUCK COMPANY, OF KENOSHA, WISCONSIN, A CORPORATION OF DELAWARE.

WHEEL.

1,339,439.   Specification of Letters Patent.   Patented May 11, 1920.

Application filed July 30, 1919. Serial No. 314,265.

*To all whom it may concern:*

Be it known that I, VIRGIL L. DOWNING, a citizen of the United States, and a resident of Kenosha, in the county of Kenosha and State of Wisconsin, have invented certain new and useful Improvements in Wheels, of which the following is a specification.

This invention relates to improvements in wheels of cast metal, and more particularly to wheels wherein all parts thereof are cast as an integral unit, such wheels being more especially adapted for heavy motor vehicles.

The object of my invention is to provide a suitable construction for a wheel of the character described wherein the maximum strength may be secured, with the minimum weight of metal, the primary object being obtained by a novel arrangement of the parts and the use of a desirable method of reinforcement designed to produce a high degree of strength at the desired points in the wheel, and at the same time provide for its efficient and workmanlike manufacture, and desirable appearance.

The features of my invention are more fully set forth in the description which follows, and in the accompanying drawings wherein—

Figure 1 is a front view of a wheel, and

Fig. 2 is a side view with a portion thereof shown in section taken on a diametral line.

The wheel, which is of the solid cast disk type, comprises three main elements, a hub 1, a disk 2, and a felly band or rim 3. The hub 1 is of the usual design, having a central bore of the conformation required to receive the axle bearings and other parts, there being provided a sleeve 4 projecting laterally from the plane of the wheel and provided with a flange 5 adapted to abut against and to be connected to other moving parts of the vehicle by means of bolts passing through bolt holes 6.

Extending from the central portion of the hub is the disk or intermediate part of the wheel 2, the same lying in a plane at right angles to the central axis of the hub throughout a portion 7 thereof embracing substantially one half the diameter of the wheel. Beyond the portion 7 of the disk is provided an offset portion 8, curving outwardly and away from the projecting portion 4 of the hub, and giving the wheel a concave or "dished" conformation throughout the central portion thereof. Beyond the portion 8 is the outer or rim portion 9 of the disk, said portion being a rectification of the offset portion into a plane parallel with and offset slightly from the plane of the inner portion 7. The thickness of the metal of the disk is slightly reduced throughout the outer portion 9, such reduction being assumed gradually beginning at the offset portion 8.

Joined to the disk and surrounding the same is the rim or felly-band 3, the same being integral with said disk and having a thickness substantially equal to that of the adjacent portion 9 of the disk. The felly-band may be of any desired width although as a preferable construction the same is disposed centrally upon the disk so that the same, together with the portion 9, presents a section of true T-form.

As a means for securing the desired reinforcement and added strength to the parts of the wheel, series of reinforcing webs or ribs are employed, the same being cast integral with the parts of the wheel connected thereby. The arrangement of these webs will be understood from the following: On the outer or front face of the wheel are provided a series of radially disposed webs 11, the same having a triangular shape, their bases being joined to and extending throughout the length of the outwardly projecting portion of the hub and tapering radially outwardly and merging with the disk at a point substantially midway between said hub and the felly-band 3. Similarly on the opposite or inner face of the wheel are provided a series of webs 12, spaced at equal distances around the hub and between the base of the disk 2 and the flange 5 of the hub.

Around the periphery of the wheel are provided other series of reinforcing webs 13 extending radially from the under face of the rim or felly-band 3, with which member and said disk the webs are integral. These webs are of triangular shape having their base portions extending transversely throughout from the disk to the outer margins of the rim, said webs 13 likewise extending radially inward and terminating adjacent to the offset portion 8 of the disk. There are provided a comparatively large number of these webs 13, spaced at equal distances around the periphery of the wheel, and preferably arranged in pairs on opposite sides of the disk. The purpose of these webs is obviously to support the rim or felly-band 3, permitting a substantial decrease in the thickness of metal of the disk throughout the periphery thereof.

A wheel constructed as herein disclosed embraces such features as will render possible, the production of metal wheels, capable of withstanding the stresses to which they are subjected, and by reason of the novel formation of the parts whereby the maximum strength is obtained, with minimum weight, a desirable wheel for heavy duty vehicles is secured.

I claim as my invention:

A cast wheel comprising a hub, a disk integral with said hub, a felly band integral with said disk, a plurality of radially disposed reinforcing webs connecting said hub and disk, and a plurality of integral webs equidistantly spaced about the periphery of said disk on opposite sides thereof and joining the inner face of said felly band to the marginal portion of said disk.

In witness whereof, I hereunto subscribe my name this 26 day of July, A. D. 1919.

VIRGIL L. DOWNING.